United States Patent
Peter, III et al.

(10) Patent No.: US 12,401,655 B1
(45) Date of Patent: Aug. 26, 2025

(54) SYSTEMS AND METHODS TO MANAGE ACCESS TO ASSETS OF A COMPUTER ENVIRONMENT BASED ON USER AND ASSET GROUPING

(71) Applicant: Asana, Inc., San Francisco, CA (US)

(72) Inventors: Phillips Smith Peter, III, Long Island City, NY (US); Caleb David Wang, San Francisco, CA (US); Joshua Ryan Smith, Albany, NY (US); Megan Maureen Daly, San Francisco, CA (US); Zachary Isaac Millman, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 170 days.

(21) Appl. No.: 18/305,763

(22) Filed: Apr. 24, 2023

(51) Int. Cl.
*H04L 9/40* (2022.01)

(52) U.S. Cl.
CPC .......... *H04L 63/104* (2013.01); *H04L 63/105* (2013.01)

(58) Field of Classification Search
CPC ............................ H04L 63/104; H04L 63/105
See application file for complete search history.

(56) References Cited

U.S. PATENT DOCUMENTS

| | | | |
|---|---|---|---|
| 5,233,687 A | 8/1993 | Henderson, Jr. | |
| 5,524,077 A | 6/1996 | Faaland | |
| 5,530,861 A | 6/1996 | Diamant | |
| 5,608,898 A | 3/1997 | Turpin | |
| 5,611,076 A | 3/1997 | Durflinger | |
| 5,623,404 A | 4/1997 | Collins | |
| 5,721,770 A | 2/1998 | Kohler | |
| 5,983,277 A | 11/1999 | Heile | |
| 5,987,453 A | 11/1999 | Krishna | |
| 6,024,093 A | 2/2000 | Cron | |
| 6,167,399 A | 12/2000 | Hoang | |
| 6,256,651 B1 | 7/2001 | Tuli | |
| 6,292,830 B1 | 9/2001 | Taylor | |
| 6,332,147 B1 | 12/2001 | Moran | |
| 6,385,639 B1 | 5/2002 | Togawa | |
| 6,442,748 B1 | 8/2002 | Bowman-Amuah | |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

"U.S. Appl. No. 14/584,750, Examiner Interview Summary mailed Feb. 25, 2016", 3 pgs.

(Continued)

*Primary Examiner* — Michael Won
(74) *Attorney, Agent, or Firm* — Esplin & Associates, PC

(57) ABSTRACT

Systems and methods to manage access to assets of a computer environment based on user and asset grouping are described herein. Exemplary implementations may perform one or more of: manage asset groups associated with one or more assets of a computer environment; manage user groups associated with individual asset groups; assign users to user groups to cause access characteristics of associated assets to be granted to users; enable and/or disable individual access characteristics based on assigned ones of the user groups; and/or other operations.

14 Claims, 4 Drawing Sheets

(56) References Cited

U.S. PATENT DOCUMENTS

| | | |
|---|---|---|
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,143,108 B1 | 11/2006 | George |
| 7,349,920 B1 | 3/2008 | Feinberg |
| 7,386,797 B1 | 6/2008 | Chatterjee |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,801,886 B1 | 9/2010 | Gabriel |
| 7,805,327 B1 | 9/2010 | Schulz |
| RE41,848 E | 10/2010 | Daniell |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,327,419 B1 * | 12/2012 | Korablev ............ H04L 63/105 726/19 |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,700,537 B1 | 4/2014 | Deshpande |
| 8,768,751 B2 | 7/2014 | Jakowski |
| 8,831,879 B2 | 9/2014 | Stamm |
| 8,843,832 B1 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,585,654 B2 | 3/2020 | Singh |
| 10,594,788 B2 | 3/2020 | Larabie-Belanger |
| 10,606,859 B2 | 3/2020 | Smith |
| 10,606,901 B1 | 3/2020 | Nair |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Justin |
| 11,095,468 B2 | 8/2021 | Pandey |
| 11,108,828 B1 * | 8/2021 | Curtis ............... H04L 63/104 |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0028616 A1 | 2/2003 | Aoki |
| 2003/0036934 A1 | 2/2003 | Ouchi |
| 2003/0041317 A1 | 2/2003 | Sokolov |
| 2003/0046576 A1 * | 3/2003 | High, Jr. ............ H04L 63/20 726/1 |
| 2003/0097406 A1 | 5/2003 | Stafford |
| 2003/0097410 A1 | 5/2003 | Atkins |
| 2003/0126001 A1 | 7/2003 | Northcutt |
| 2003/0156138 A1 | 8/2003 | Vronay |
| 2003/0200223 A1 | 10/2003 | Hack |
| 2003/0220975 A1 * | 11/2003 | Malik ............... H04L 63/105 709/205 |
| 2003/0225598 A1 | 12/2003 | Yu |
| 2003/0233265 A1 | 12/2003 | Lee |
| 2003/0233268 A1 | 12/2003 | Taqbeem |
| 2003/0236979 A1 * | 12/2003 | Himmel ............ H04L 63/08 713/167 |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0261013 A1 | 12/2004 | Wynn |
| 2004/0268451 A1 | 12/2004 | Robbin |
| 2005/0144022 A1 | 6/2005 | Evans |
| 2005/0210394 A1 | 9/2005 | Crandall |
| 2005/0216111 A1 | 9/2005 | Nobuhiro |
| 2005/0222971 A1 | 10/2005 | Cary |
| 2006/0028917 A1 | 2/2006 | Wigginton |
| 2006/0047454 A1 | 3/2006 | Tamaki |
| 2006/0048151 A1 | 3/2006 | Haruta |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |

(56) References Cited

U.S. PATENT DOCUMENTS

| | | |
|---|---|---|
| 2006/0224430 A1 | 10/2006 | Butt |
| 2006/0235985 A1* | 10/2006 | Ramkumar ............ H04L 67/12 709/229 |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0133524 A1 | 6/2008 | Ryan |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0282326 A1* | 11/2008 | Miller ................... H04L 63/104 726/4 |
| 2008/0313004 A1 | 12/2008 | Ryan |
| 2008/0313730 A1* | 12/2008 | Iftimie .................... H04L 63/20 726/17 |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0081417 A1* | 4/2010 | Hickie ................... G06F 21/604 455/414.1 |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0238706 A1 | 9/2011 | Wong |
| 2011/0270644 A1 | 11/2011 | Roncolato |
| 2011/0302521 A1 | 12/2011 | Jiang |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158757 A1 | 6/2012 | Bhattacharjee |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Brian |

(56) References Cited

U.S. PATENT DOCUMENTS

| | | | |
|---|---|---|---|
| 2014/0040905 A1 | 2/2014 | Tadanobu | |
| 2014/0058801 A1 | 2/2014 | Deodhar | |
| 2014/0059910 A1 | 3/2014 | Norton | |
| 2014/0074536 A1 | 3/2014 | Meushar | |
| 2014/0081685 A1 | 3/2014 | Thacker | |
| 2014/0089719 A1 | 3/2014 | Daum | |
| 2014/0101310 A1 | 4/2014 | Savage | |
| 2014/0156539 A1 | 6/2014 | Brunet | |
| 2014/0165001 A1 | 6/2014 | Shapiro | |
| 2014/0172478 A1 | 6/2014 | Vadasz | |
| 2014/0189017 A1 | 7/2014 | Prakash | |
| 2014/0200944 A1 | 7/2014 | Henriksen | |
| 2014/0208325 A1 | 7/2014 | Chen | |
| 2014/0215344 A1 | 7/2014 | Ligman | |
| 2014/0229609 A1 | 8/2014 | Wong | |
| 2014/0236663 A1 | 8/2014 | Smith | |
| 2014/0244334 A1 | 8/2014 | De | |
| 2014/0257894 A1 | 9/2014 | Melahn | |
| 2014/0279294 A1 | 9/2014 | Field-Darragh | |
| 2014/0288987 A1 | 9/2014 | Liu | |
| 2014/0310047 A1 | 10/2014 | De | |
| 2014/0310051 A1 | 10/2014 | Meng | |
| 2014/0343989 A1* | 11/2014 | Martini | H04L 63/104 705/7.17 |
| 2014/0350997 A1 | 11/2014 | Holm | |
| 2014/0364987 A1 | 12/2014 | Shikano | |
| 2015/0006448 A1 | 1/2015 | Gupta | |
| 2015/0007058 A1 | 1/2015 | Wooten | |
| 2015/0012330 A1 | 1/2015 | Sugiura | |
| 2015/0052437 A1 | 2/2015 | Crawford | |
| 2015/0058053 A1 | 2/2015 | De | |
| 2015/0113540 A1 | 4/2015 | Rabinovici | |
| 2015/0134393 A1 | 5/2015 | De | |
| 2015/0153906 A1 | 6/2015 | Liao | |
| 2015/0154526 A1 | 6/2015 | Yates | |
| 2015/0178666 A1 | 6/2015 | Green | |
| 2015/0200966 A1* | 7/2015 | Kasturirangan | H04L 63/10 726/4 |
| 2015/0213411 A1 | 7/2015 | Swanson | |
| 2015/0215256 A1 | 7/2015 | Ghafourifar | |
| 2015/0262111 A1 | 9/2015 | Yu | |
| 2015/0312375 A1 | 10/2015 | Valey | |
| 2015/0317595 A1 | 11/2015 | De | |
| 2015/0339006 A1 | 11/2015 | Chaland | |
| 2015/0363092 A1 | 12/2015 | Morton | |
| 2015/0363733 A1 | 12/2015 | Brown | |
| 2015/0379472 A1 | 12/2015 | Gilmour | |
| 2016/0012368 A1 | 1/2016 | O'Connell | |
| 2016/0034844 A1 | 2/2016 | Kofman | |
| 2016/0048408 A1 | 2/2016 | Madhu | |
| 2016/0048786 A1 | 2/2016 | Fukuda | |
| 2016/0063192 A1 | 3/2016 | Johnson | |
| 2016/0063449 A1 | 3/2016 | Duggan | |
| 2016/0072750 A1 | 3/2016 | Kass | |
| 2016/0092045 A1 | 3/2016 | Lamas | |
| 2016/0110670 A1 | 4/2016 | Chatterjee | |
| 2016/0124775 A1 | 5/2016 | Ashtiani | |
| 2016/0140474 A1 | 5/2016 | Vekker | |
| 2016/0140501 A1 | 5/2016 | Figlin | |
| 2016/0147773 A1 | 5/2016 | Smith | |
| 2016/0147846 A1 | 5/2016 | Smith | |
| 2016/0148157 A1 | 5/2016 | Walia | |
| 2016/0180277 A1 | 6/2016 | Skiba | |
| 2016/0180298 A1 | 6/2016 | McClement | |
| 2016/0182311 A1 | 6/2016 | Borna | |
| 2016/0188145 A1 | 6/2016 | Gabor | |
| 2016/0216854 A1 | 7/2016 | McClellan | |
| 2016/0224939 A1 | 8/2016 | Chen | |
| 2016/0234391 A1 | 8/2016 | Wolthuis | |
| 2016/0275436 A1 | 9/2016 | Kurjanowicz | |
| 2016/0313934 A1 | 10/2016 | Isherwood | |
| 2016/0328217 A1 | 11/2016 | Hagerty | |
| 2016/0342927 A1 | 11/2016 | Reznik | |
| 2017/0004213 A1 | 1/2017 | Cunico | |
| 2017/0009387 A1 | 1/2017 | Ge | |
| 2017/0017364 A1 | 1/2017 | Kekki | |
| 2017/0017924 A1 | 1/2017 | Kashiwagi | |
| 2017/0039503 A1 | 2/2017 | Jones | |
| 2017/0061341 A1 | 3/2017 | Haas | |
| 2017/0068933 A1 | 3/2017 | Norton | |
| 2017/0093871 A1* | 3/2017 | Abuelsaad | H04L 63/101 |
| 2017/0093874 A1 | 3/2017 | Uthe | |
| 2017/0099296 A1 | 4/2017 | Fisher | |
| 2017/0103369 A1 | 4/2017 | Thompson | |
| 2017/0116552 A1 | 4/2017 | Deodhar | |
| 2017/0132200 A1 | 5/2017 | Noland | |
| 2017/0153799 A1 | 6/2017 | Hoyer | |
| 2017/0154024 A1 | 6/2017 | Subramanya | |
| 2017/0177671 A1 | 6/2017 | Allgaier | |
| 2017/0185592 A1 | 6/2017 | Frei | |
| 2017/0192642 A1 | 7/2017 | Fishman | |
| 2017/0206217 A1 | 7/2017 | Deshpande | |
| 2017/0237745 A1* | 8/2017 | Desai | H04L 63/104 726/1 |
| 2017/0249577 A1 | 8/2017 | Nishikawa | |
| 2017/0316367 A1 | 11/2017 | Candito | |
| 2017/0317898 A1 | 11/2017 | Candito | |
| 2017/0323233 A1 | 11/2017 | Bencke | |
| 2017/0323267 A1 | 11/2017 | Baek | |
| 2017/0323350 A1 | 11/2017 | Laderer | |
| 2017/0344754 A1 | 11/2017 | Kumar | |
| 2017/0346861 A1 | 11/2017 | Pearl | |
| 2017/0351385 A1 | 12/2017 | Ertmann | |
| 2018/0032524 A1 | 2/2018 | Byron | |
| 2018/0052943 A1 | 2/2018 | Hui | |
| 2018/0053127 A1 | 2/2018 | Boileau | |
| 2018/0059910 A1 | 3/2018 | Wooten | |
| 2018/0060785 A1 | 3/2018 | Carnevale | |
| 2018/0060818 A1 | 3/2018 | Ishiyama | |
| 2018/0063063 A1 | 3/2018 | Yan | |
| 2018/0068271 A1 | 3/2018 | Abebe | |
| 2018/0075387 A1 | 3/2018 | Kulkarni | |
| 2018/0088754 A1 | 3/2018 | Psenka | |
| 2018/0089625 A1 | 3/2018 | Rosati | |
| 2018/0095938 A1 | 4/2018 | Monte | |
| 2018/0102989 A1 | 4/2018 | Borsutsky | |
| 2018/0131649 A1 | 5/2018 | Ma | |
| 2018/0157477 A1 | 6/2018 | Johnson | |
| 2018/0165610 A1 | 6/2018 | Dumant | |
| 2018/0173386 A1 | 6/2018 | Adika | |
| 2018/0189706 A1 | 7/2018 | Newhouse | |
| 2018/0189736 A1 | 7/2018 | Guo | |
| 2018/0225795 A1 | 8/2018 | Napoli | |
| 2018/0247352 A1 | 8/2018 | Rogers | |
| 2018/0260081 A1 | 9/2018 | Beaudoin | |
| 2018/0262620 A1 | 9/2018 | Wolthuis | |
| 2018/0284985 A1 | 10/2018 | Bansal | |
| 2018/0285471 A1 | 10/2018 | Hao | |
| 2018/0316636 A1 | 11/2018 | Kamat | |
| 2018/0331842 A1 | 11/2018 | Faulkner | |
| 2018/0357049 A1 | 12/2018 | Epstein | |
| 2018/0367477 A1 | 12/2018 | Hariram | |
| 2018/0367483 A1 | 12/2018 | Rodriguez | |
| 2018/0373804 A1 | 12/2018 | Zhang | |
| 2019/0005048 A1 | 1/2019 | Crivello | |
| 2019/0014070 A1 | 1/2019 | Mertvetsov | |
| 2019/0018552 A1 | 1/2019 | Bloy | |
| 2019/0034057 A1 | 1/2019 | Rudchenko | |
| 2019/0068390 A1 | 2/2019 | Gross | |
| 2019/0079909 A1 | 3/2019 | Purandare | |
| 2019/0080289 A1 | 3/2019 | Kreitler | |
| 2019/0095839 A1 | 3/2019 | Yuki | |
| 2019/0095846 A1 | 3/2019 | Gupta | |
| 2019/0102700 A1 | 4/2019 | Babu | |
| 2019/0138583 A1 | 5/2019 | Silk | |
| 2019/0138589 A1 | 5/2019 | Udell | |
| 2019/0138961 A1 | 5/2019 | Santiago | |
| 2019/0139004 A1 | 5/2019 | Vukovic | |
| 2019/0147386 A1 | 5/2019 | Balakrishna | |
| 2019/0187987 A1 | 6/2019 | Fauchère | |
| 2019/0213509 A1 | 7/2019 | Burleson | |
| 2019/0265821 A1 | 8/2019 | Pearl | |
| 2019/0327271 A1* | 10/2019 | Saxena | H04L 41/16 |
| 2019/0340166 A1 | 11/2019 | Raman | |

(56) References Cited

U.S. PATENT DOCUMENTS

| | | | |
|---|---|---|---|
| 2019/0340296 | A1 | 11/2019 | Cunico |
| 2019/0340574 | A1 | 11/2019 | Ekambaram |
| 2019/0347094 | A1 | 11/2019 | Sullivan |
| 2019/0347126 | A1 | 11/2019 | Bhandari |
| 2019/0370320 | A1 | 12/2019 | Kalra |
| 2020/0019907 | A1 | 1/2020 | Notani |
| 2020/0059539 | A1 | 2/2020 | Wang |
| 2020/0065736 | A1 | 2/2020 | Relangi |
| 2020/0162315 | A1 | 5/2020 | Siddiqi |
| 2020/0192538 | A1 | 6/2020 | Karpe |
| 2020/0192908 | A1 | 6/2020 | Smith |
| 2020/0193556 | A1 | 6/2020 | Jin |
| 2020/0218551 | A1 | 7/2020 | Sabo |
| 2020/0228474 | A1 | 7/2020 | Cameron |
| 2020/0233879 | A1 | 7/2020 | Papanicolaou |
| 2020/0244611 | A1 | 7/2020 | Rosenstein |
| 2020/0293975 | A1 | 9/2020 | Faulkner |
| 2020/0328906 | A1 | 10/2020 | Raghavan |
| 2020/0344253 | A1 | 10/2020 | Kurup |
| 2021/0004380 | A1 | 1/2021 | Koch |
| 2021/0004381 | A1 | 1/2021 | Smith |
| 2021/0097466 | A1 | 4/2021 | Sabo |
| 2021/0103451 | A1 | 4/2021 | Sabo |
| 2021/0110347 | A1 | 4/2021 | Khalil |
| 2021/0117907 | A1 | 4/2021 | Gray |
| 2021/0136012 | A1 | 5/2021 | Barbitta |
| 2021/0182475 | A1 | 6/2021 | Pelz |
| 2021/0216562 | A1 | 7/2021 | Smith |
| 2021/0232282 | A1 | 7/2021 | Karpe |
| 2021/0248161 | A1 | 8/2021 | Leston |
| 2021/0320891 | A1 | 10/2021 | Rosenstein |
| 2021/0342786 | A1 | 11/2021 | Jiang |
| 2021/0382734 | A1 | 12/2021 | Rosenstein |
| 2022/0019320 | A1 | 1/2022 | Sabo |
| 2022/0058548 | A1 | 2/2022 | Garg |
| 2022/0075792 | A1 | 3/2022 | Koch |
| 2022/0078142 | A1 | 3/2022 | Cameron |
| 2022/0158859 | A1 | 5/2022 | Raghavan |
| 2023/0161955 | A1 | 5/2023 | Pelz |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU ( Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018- Toggl https://toggl.com/blog/best-team-calendar-applications-for-2018 (Year: 2017) 3 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov. 19, 2014- Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana, Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76. (Year: 2016).

Devon Watts and Nick Fassler, "Now rolling out in beta: Track anything in Asana, with custom fields", publisher: Asana, published: Jul. 12, 2016, pp. 1-7 (Year: 2016).

Fang Chen, R. O. Briggs, "Project Progress Tracking Template - Using a Repeatable GSS Process to Facilitate Project Process Management," Proceedings of the 39th Annual Hawaii International Conference on System Sciences (HICSS'06), Kauai, HI, USA, 2006, pp. 17c-17c, doi: 10.1109/HICSS.2006.399. (Year: 2006).

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Hartmann, "TimeProjectscheduling with resource capacities and requests varying with time: a case study," 2013, Flexible services and manufacturing journal, vol. 25, No. 1, pp. 74-93 (Year: 2013).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv30 (Year: 2017) (24 pages).

(56) References Cited

OTHER PUBLICATIONS

How to Asana, Planning with Asana calendar, youtube excerpt, Feb. 14, 2017 https://www.youtube.com/watch?v=w816KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Auren Labrecque, "Fostering Consumer-Brand Relationships in Social Media Environments: The Role of Parasocial Interaction", 2014, Journal of Interactive Markeing, 28 (2014), pp. 134-148 (Year: 2014).

M. Ramzan, M. A. Iqbal, M. A. Jaffar, A. Rauf, S. Anwar and A. A. Shahid, "Project Scheduling Conflict Identification and Resolution Using Genetic Algorithms," 2010 International Conference on Information Science and Applications, Seoul, Korea (South), 2010, pp. 1-6, doi: 10.1109/ICISA.2010.5480400. (Year: 2010).

Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).

Paul Minors, How to automate your tasks, youtube excerpts, Oct. 18, 2019 https://www.youtube.com/watch? v=lwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Ruoming Pang, Ramon Caceres, Mike Burrows, Zhifeng Chen, Pratik Dave, Nathan Germer, Alexander Golynski, Kevin Graney, Nina Kang, Lea Kissner, Jeffrey L. Korn, Abhishek Parmar, Christina D. Richards, and Mengzhi Wang, "Zanzibar: Google's Consistent, Global Authorization System", 2019 USENIX Annual Technical Conference (USENIX ATC '19), Renton, WA, pp. 1-14 (Year: 2019).

Szabolcs de Gyurky; Mark A. Tarbell, "Project and Task Organization," in The Cognitive Dynamics of Computer Science: Cost-Effective Large Scale Software Development IEEE, 2006, pp. 54-79, doi: 1002/0470036443.ch (Year: 2006).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.com, How to Use Wix Code with Marketing Tools to Create Custom Events, Oct. 18, 2018, YouTube, https:// www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

www.cogmotive.com/blog/author/alan Alan Byrne: "Creating a company Shared Calendar in Office 365"; pp. 1-17; Sep. 10, 2013 (16 pages).

\* cited by examiner

SYSTEMS AND METHODS TO MANAGE ACCESS TO ASSETS OF A COMPUTER ENVIRONMENT BASED ON USER AND ASSET GROUPING

FIELD OF THE DISCLOSURE

The present disclosure relates to systems and methods to manage access to assets of a computer environment based on user and asset grouping.

BACKGROUND

Web-based computer environments, such as software-as-a-service (Saas) products, may rely on a container- or folder-based data models to build and/or provide functionality to end users. By way of non-limiting illustration, assets making up a SaaS computer environment may only belong to a single container or hierachy at a time. Conventional SaaS features may leverage the exclusive container/hierachy configuration to build and/or organize functionality discretely. Some examples of functionality organized via these models may include, and/or may be related to, roles & permissions (authorization) assigned to users, licensing agreements granted to users, admin controls available to users, and/or control features available to users.

SUMMARY

Not all web-based computer environments may have a data model that is suitable to build out functionality in the same as or similar manner as conventional SaaS products. For example, a computer environment may define assets such that they belong to a single data object, no data object, within a hierachy of data objects, and/or within multiple hierarchies simultaneously. It may be desired to replicate conventional SaaS behavior regardless of the hierarchy, or lack thereof. Thus, the inventors of the present disclosure have identified a need to configure and/or organize computer environment assets in a way that allows for discrete building and/or organization of functionality.

An example computer environment that may take advantage of the features and/or functionality of the present disclosure may include a collaboration environment. A collaboration environment, sometimes referred to a work management platform and/or other names, may enable users to assign projects, tasks, or other assignments to assignees (e.g., other users) to complete. A collaboration environment may comprise an environment in which individual users and/or a virtual team of users does its work and enables the users to work in a more organized and efficient manner when remotely located from each other.

A collaboration environment may be comprised of assets in the form of work unit records and/or other records for work. The records may be configured such that they are associated with zero, one, or many records within a hierarchy. Records may also exist in multiple hierarchies simultaneously. For example, a task record may be associated with multiple project records, with each of the project records being associated with multiple portfolio records. Because the records may be organized as such, replicating conventional SaaS behavior cannot be done through convention techniques. Thus, there is an unmet need to replicate conventional SaaS behavior regardless of the association of records with one or more other records and/or hierarchies.

To address these and/or other problems, one or more implementations presented herein propose a technique to manage access to assets of a computer environment based on unique user and asset grouping.

One or more implementations of a system configured to manage access to assets of a computer environment based on user and asset grouping may include one or more hardware processors configured by machine-readable instructions and/or other components. Executing the machine-readable instructions may cause the one or more hardware processors to facilitate one or more features and/or functions presented herein. The machine-readable instructions may include one or more computer program components. The one or more computer program components may include one or more of an environment state component, an asset group component, a user group, and/or other components.

The environment state component may be configured to manage environment state information maintaining a computer environment. In some implementations, a computer environment may refer to one or more application programs running on a computer. The computer environment may be configured to facilitate interaction by users with the computer environment and/or each other through the computer environment. The environment state information may include information defining a computer environment through one or more of one or more user interfaces of the computer environment, the assets of the computer environment, access characteristics of the assets of the computer environment, and/or other aspects of the computer environment. By way of non-limiting illustration, the computer environment may include one or more of a collaboration environment, a customer relationship management ("CRM") program, a billing application, and/or other applications.

The asset group component may be configured to manage asset groups of a computer environment. The individual asset groups may be associated with one or more assets of a computer environment. The individual asset groups may define access characteristics of associated ones of the assets. By way of non-limiting illustration, the asset groups of a computer environment may include a first asset group and/or other asset groups. The first asset group may be associated with a first asset and may define a first set of access characteristics of the first asset of the computer environment.

The user group component may be configured to manage user groups. The individual user groups may be associated with one or more asset groups. The individual user groups may define the extent of the access characteristics defined by the individual asset groups that are granted to users through the associated individual user groups. By way of non-limiting illustration, the user groups may include one or more of a first user group, a second user group, and/or other user groups. The first user group may be associated with the first asset group and may define a first extent of the first set of access characteristics of the first asset that are granted to the users through the first user group. The second user group may be associated with the first asset group and may define a second extent of the first set of access characteristics of the first asset that are granted to the users through the second user group.

The environment state component may be configured to assign the users to the user groups. The assignment to the user groups may cause one or more of the access characteristics of associated ones of the assets to be granted to the users based on the extent of the access characteristics that are granted to the users through the user groups. By way of non-limiting illustration, a first user may be assigned to the first user group and/or other user groups; a second user may be assigned to the second user group and/or other groups; and/or one or more other users may be assigned to one or more user groups.

The environment state component may be configured to enable and/or disable individual access characteristics of individual assets for individual users. Enabling and/or disabling individual access characteristics may be based on assigned ones of the user groups and the extent that the access characteristics defined by the asset groups are granted to the users through the user groups via the asset groups. By way of non-limiting illustration, the first extent of the first set of access characteristics may be enabled for the first user accessing the first asset of the computer environment based on the first user being assigned to the first user group. By way of non-limiting illustration, the second extent of the first set of access characteristics may be enabled for the second user accessing the first asset based on the second user being assigned to the second user group.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
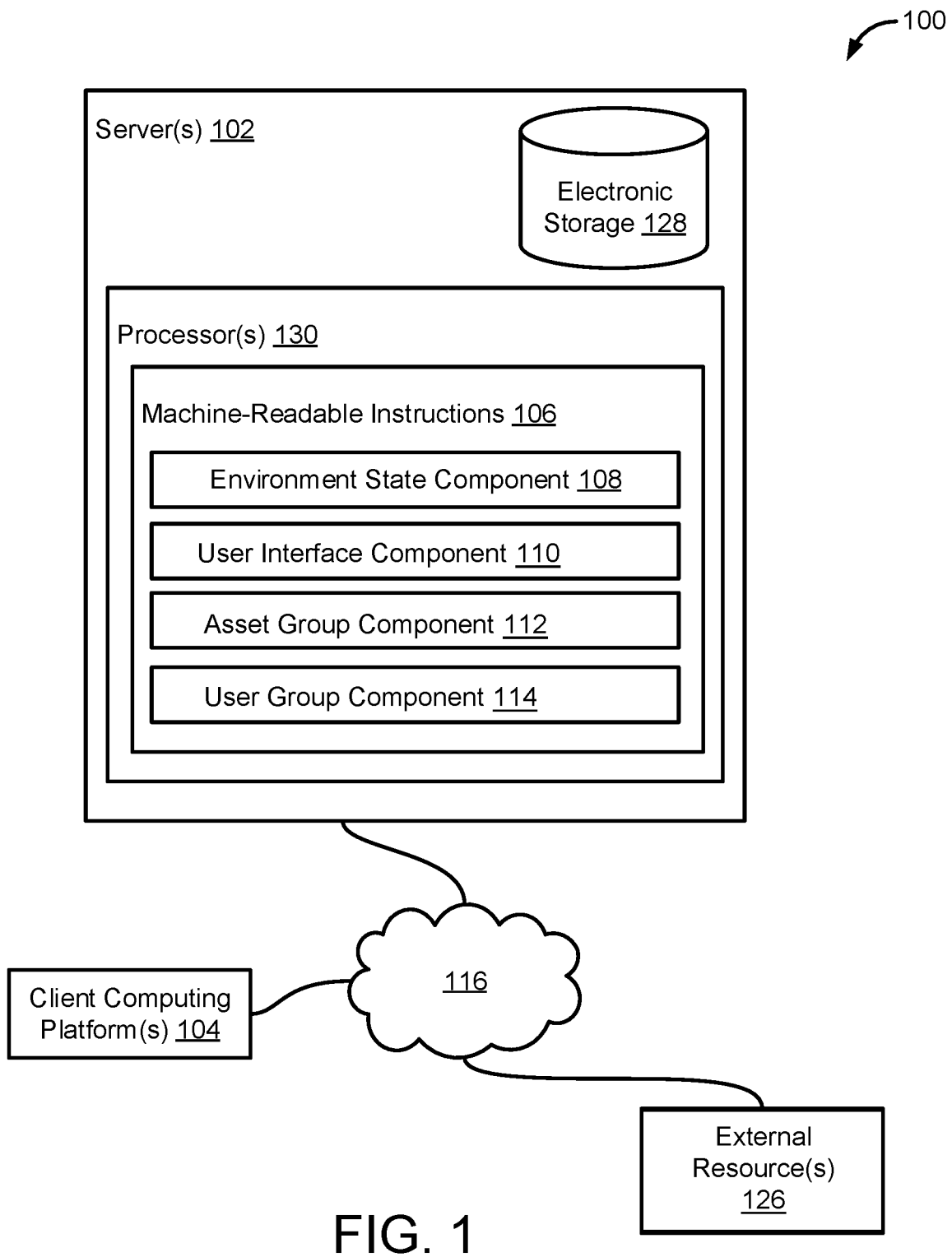
FIG. 1 illustrates a system configured to manage access to assets of a computer environment based on user and asset grouping, in accordance with one or more implementations.

FIG. 1 illustrates a system 100 configured to manage access to assets of a computer environment based on user and asset grouping, in accordance with one or more implementations. The system 100 may allow computer environments that do not have conventional SaaS data models to replicate conventional SaaS behavior to build and/or organize their functionally. One or more implementations of the system 100 may be particularly suited to handle access conflicts that may arise due to the non-SaaS data model configuration of such computer environments.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store environment state information and/or other information. Machine-readable instructions 106 may include one or more instruction components. The instruction components may include computer program components. Executing the machine-readable instructions 106 may cause server(s) 102 to facilitate managing access to assets of a computer environment based on user and asset grouping. The computer program components may include one or more of an environment state component 108, a user interface component 110, an asset group component 112, a user group component 114, and/or other components.

Environment state component 108 may be configured to manage environment state information maintaining a computer environment. In some implementations, a computer environment may refer to one or more application programs running on a computer. The computer environment may be configured to facilitate interaction by users with the computer environment and/or each other through the computer environment. The environment state information may include information defining a computer environment through one or more of user interface(s) of the computer environment, assets of the computer environment, access characteristics of the assets of the computer environment, and/or other aspects of the computer environment. By way of non-limiting illustration, the computer environment may include one or more of a collaboration environment, a customer relationship management ("CRM") program, a billing application, and/or other applications.

Assets of a computer environment may refer to information objects (sometimes referred to as "data objects" or simply "objects") that make up the computer environment, and/or other expressions of digitally stored information. A data object may comprise a region of storage that contains a value or group of values of one or more parameters. An individual value may be accessed using its identifier and/or a more complex expression that refers to an object. In some implementations, an object may have a unique data type.

In some implementations, access characteristics may define a user's ability to access, view, modify, and/or otherwise interact with one or more information objects of a computer environment through one or more user interfaces of the computer environment. In some implementations, access characteristics granted to the users may be expressed as one or more of user roles within a computer environment, permissions the users have within a computer environment, user license agreements within the computer environment, control levels available to be exercised within a computer environment, and/or other access characteristics. By way of non-limiting illustration, different level accounts or licenses may be reflected by different types or levels of access to assets. By way of non-limiting illustration, users of a given role may have a certain level of control over one or more assets, while users of another role may have a different level of control of the one or more assets.

Environment state component 108 may be configured to manage environment state information maintaining a collaboration environment. The collaboration environment may be configured to facilitate interaction by users with the collaboration environment and/or each other. The environment state information may include one or more records. The records may include one or more of user records, work unit records, and/or other records. In some implementations, individual records and/or groups of records may from the assets of a collaboration environment. In some implementations, a calendar provided through the collaboration environment, or another application, may comprise an asset. By way of non-limiting illustration, an individual record may be in the form of an individual information object. The user records may include user information describing the users of the collaboration environment. The work unit records may include work unit information describing units of work assigned to, created by, and/or managed by the users within the collaboration environment. Although one or more implementations of the features and/or functions presented herein may refer to a collaboration environment, this is for illustrative purposes only and is not to be considered limiting. Instead, those skilled in the art will understood that such features and/or functions may similarly apply to other computer environments.

In some implementations, sets of the work unit records may be specifically designated as being associated with one or more record hierarchies. Individual work unit records associated with an individual hierarchy may be designated as being subordinate and/or superior to one or more other records within the individual hierarchy. These work unit records may have features and/or functionality specific to them, which are particularly well adapted for organizing, managing, and/or otherwise aiding in the ongoing nature of hierarchical definitions of work.

The user information in the user records may include values of user parameters and/or other information. The values of the user parameters may be organized in the user records corresponding to users interacting with and/or viewing the collaboration environment. The values of the user parameters may include information describing and/or identifying the users, their actions within the collaboration environment, their settings, metadata associated with the users, work they are members of and/or collaborate on, and/or other user information. Individual ones of the users may be associated with individual ones of the user records. A user record may define values of the user parameters associated with a given user.

The values of the user parameters may, by way of non-limiting example, specify one or more of: a user name, a group, a user account level, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), work inclusion information (e.g., identification of work unit records they are members of and/or collaborate on), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, external resources may include a calendar application which may be external to a collaboration environment. The collaboration environment may have permissions to access the external calendar application to determine and/or obtain schedule information.

Work inclusion information may include identification(s) of work unit records that individual users are members of and/or collaborate with one or more other users on.

The "members" of the work unit records may include specifically named users within the work unit records. Specifically naming users may be accomplished by linking user records for those users to the work unit records. Linking the user records to the work unit records may comprise including a referential notation of the user records in the work unit records. Linking the user records to the work unit records may comprise including copies or instances of the user records in the work unit records. In some implementations, users having a particular status with respect to a work unit record may be considered members. By way of non-limiting illustration, users who are designated to perform one or more actions to facilitate completion of the units of work (e.g., assignees, assignors, creators, managers, collaborators, and/or other users) may be considered members. In some implementations, "member" status may be a status that is separate and distinct from users who are activity performing one or more actions to facilitate completion of the units of work. In some implementations, "member" may refer to users who view, access, monitor, and/or otherwise engage with units of work in ways that may not directly facilitate completion of the units of work.

The work unit information in the work unit records may include values of one or more work unit parameters and/or other information. The values of the work unit parameters may be organized in work unit records corresponding to units of work managed, created, and/or assigned within the collaboration environment. A given unit of work may have one or more assignees, owners, and/or collaborators working on the given work unit. Units of work may include one or more of tasks, projects, portfolios, objectives, and/or other units of work.

Work unit records may be created by a given user for the given user and/or created by the given user and assigned to one or more other users. Work unit records may be created by a given user for the given user and/or created by the given user and managed by one or more other users.

Individual units of work may include and/or may be associated with one or more digital content items. An individual unit of work may include an individual digital content item by virtue of the individual digital content item (and/or a copy or instance thereof) being accessible via a work unit page of the unit of work (e.g., via link, URL, a pointer, and/or other techniques to provide access). A digital content item may include one or more of an image, a video, an audio file, a PDF, a word document, multimedia presentations, a webpage, and/or other digital content items.

In some implementations, work unit records created by, assigned to, and/or completed by the users may refer generally to a linking of the work unit records with the individual users in the collaboration environment. A work unit record may be linked with a user in a manner that defines one or more relationships between the user and the work unit record. Such a relationship may connote and/or be a result of an action (past, present, and/or future) of the user with respect to the work unit record and/or a unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

In some implementations, values of work unit parameters may specify one or more of a unit of work name, a unit of work description, user role information, one or more unit of work dates (e.g., a start date, a due date or end date, a completion date, and/or other dates), monetary budget and/or consumption, an amount of work production, project inclusion (e.g., identification of projects supported by the individual units of work), objective inclusion (e.g., identification of objectives supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency information, one or more custom fields (e.g., priority, cost, stage, and/or other custom fields), and/or other information.

In some implementations, work unit parameters may include one or more of a work assignment parameter, a work completion parameter, a work management parameter, a work creation parameter, a dependency parameter, a grouping parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work or vice versa.

The values of the work assignment parameter describing assignment of users to units of work may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete." In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, a completion status may include one or more of "rejected," "revisions required," "incomplete," and/or other statuses. By way of non-limiting illustration, for units of work that require one user to review work by another user, additional user interface elements may be presented where users can set the status as one or more of "marked complete," "incomplete," "rejected," "revisions required," and/or other statuses. In some implementations, a status of rejected for a unit of work may be associated with the passing of an end date associated with the unit of work without the work having been marked complete manually. In some implementations, a status of rejected for a unit of work may be associated with a user specifying the unit of work as rejected. In some implementations, a status of revisions required for a unit of work may be associated with a user specifying that the work being reviewed requires changes but is otherwise approved. In some implementations, a status of revisions required may present the reviewing user with options to specify what revisions are required. In some implementations, a status of revisions required may cause a follow up unit of work to be generated which is assigned back to the assignor of the original work.

In some implementations, values of a grouping parameter may describe whether a given unit of work supports (e.g., is included in) a project and/or objective. The values may specify one or more of a name/title of another work unit record (e.g., project, objective), a name/username of an owner of another work unit record, and/or other information.

In some implementations, work unit records may define tasks. The work unit records defining tasks may be referred to as task records. The work unit information in task records may be referred to as task information and/or other information. Task information may include values of work unit parameters for tasks managed within the collaboration environment. The work unit parameters for tasks may be referred to as "task parameters." The work unit parameters comprising task parameters may be specific to tasks and/or may include one or more parameters not shared with projects, objectives, and/or other records. The task parameters may characterize one or more tasks created, assigned, and/or managed within the collaboration environment and/or via the collaboration environment and/or the metadata associated with the one or more tasks.

In some implementations, work unit records may define projects. The work unit records defining projects may be referred to as project records. The work unit information in project records may be referred to as project information and/or other information. Project information may include values of work unit parameters for projects managed within the collaboration environment. The work unit parameters for projects may be referred to as "project parameters." The work unit parameters comprising project parameters may be specific to project records and may include one or more parameters not shared with tasks, objectives, and/or other records. The project parameters may characterize one or more projects created, owned, assigned, and/or managed within the collaboration environment and/or via the collaboration environment and/or the metadata associated with the one or more projects. Individual ones of the projects may be associated with individual ones of the records. A given project may have one or more owners and/or one or more collaborators working on the given project. The given project may be associated with one or more other units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client, and the units of work under the individual project heading may be work directly contributing to the fulfillment of a business relationship with the client.

The values of the project parameters may, by way of non-limiting example, include one or more of: one or more units of work associated with individual ones of the projects (which may include values of other work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, work unit records may define portfolios. The work unit records defining portfolios may be referred to as portfolio records. The work unit information in portfolio records may be referred to as portfolio information and/or other information. Portfolio information may include values of work unit parameters for portfolios managed within the collaboration environment. The work unit parameters for portfolios may be referred to as "portfolio parameters." The work unit parameters comprising portfolio parameters may be specific to portfolio records and may include one or more parameters not shared with tasks, projects, objectives, and/or other records. The portfolio parameters may characterize one or more portfolios created, owned, assigned, and/or managed within the collaboration environment and/or via the collaboration environment and/or the metadata associated with the one or more portfolios. Individual ones of the portfolios may be associated with individual ones of the records. A given portfolio may have one or more owners and/or one or more collaborators working on the given portfolio. The given portfolio may be associated with one or more other units of work assigned to one or more users under the given portfolio heading. In some implementations, a given portfolio may not have any owners and/or collaborators at the portfolio level other than those specified with respect to the projects subordinate to the portfolio. In some implementations, portfolios may be associated with one or more units of work that may directly facilitate progress toward fulfillment of the portfolios. Accordingly, completion of units of work may directly contribute to progress toward fulfillment of the portfolio. By way of non-limiting illustration, an individual portfolio may be associated with a client, and the units of work under the individual portfolio heading may be work directly contributing to the fulfillment of a business relationship with the client.

The values of the portfolio parameters may, by way of non-limiting example, include and/or specify one or more of: information about one or more projects, tasks, and/or objectives within a given portfolio, information about one or more other portfolios within a given portfolio (which may include values of portfolio parameters defined by one or more other portfolio records), a portfolio name, a portfolio description, a status and/or progress (e.g., an update, a hardcoded status update, a measured status, quantity of units of work remaining in a given project, completed units of work in a given project, and/or other status parameter), one or more attachments, notification settings, privacy settings, an associated URL, one or more interaction parameters (e.g., sources of the interactions, context of the interactions, content of the interactions, time for the interactions, and/or other interaction parameters), updates, ordering of projects within the given portfolio, hierarchical information, permissions information, state of a workspace for a given project within the given portfolio, metadata associated with the portfolios, custom fields (e.g., values created by users), and/or other information.

In some implementations, work unit records may define objectives. The work unit records defining objectives may be referred to as objective records. The work unit information in objective records may be referred to as objective information. The objective information may include values of one or more work unit parameters that define the objectives. The values of the work unit parameters may be organized in objective records corresponding to objectives (sometimes referred to as "business objectives") managed, created, and/or owned within the collaboration environment. The work unit parameters corresponding to objectives may be referred to as "objective parameters." The work unit parameters comprising objective parameters may be specific to objectives and may include one or more parameters not shared with tasks and/or projects. A given objective may have one or more collaborators, and/or team members working on the given objective. Objectives may be associated with one or more units of work one or more users should accomplish and/or plan on accomplishing. Objectives may be created by a given user for the given user and/or created by the given user and assigned to be owned to one or more other users. Individual objectives may include one or more of an individual goal, an individual sub-goal, and/or other business objectives assigned to be owned by a user and/or associated with one or more users.

The objectives may be associated with a set of units of work that may indirectly facilitate progress toward fulfillment of the objectives. The set of units of work may not directly contribute to the progress. By way of non-limiting illustration, a connection between the set of units of work and a corresponding objective may be indirect in that completion of at least one of the units of work may have no direct impact on progress toward fulfillment of the objective. The concept of "no direct impact" may mean that completion of the at least one unit of work may not cause progress toward fulfillment of the business objective without independent action outside of the at least one unit of work and/or project. Instead, the fulfillment of the at least one unit of work may make such independent action more likely (e.g., through coercion, assistance, education, incentivization, reminder, etc.). However, in some implementations, objectives may be associated with one or more units of work that may directly facilitate progress toward fulfillment of the objectives. Accordingly, completion of the set of units of work may directly contribute to the progress toward fulfillment. Objectives may be associated with an objectives and key result (OKR) goal-setting framework. Objectives may be specified on one or more of a team basis, organization basis, and/or other specifications. In some implementations, objectives may be characterized as user objectives. User objectives may be specified on an individual user basis. A user objective may be associated with a set of units of work assigned to a user that may indirectly (and/or directly) facilitate progress toward fulfillment of the user objective.

In some implementations, objectives may be described based on one or more of a business objective name, a business objective description, one or more business objective dates (e.g., a start date, a due date, and/or other dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing objectives owned by the individual users may be determined based on one or more interactions by one or more users with a collaboration environment. In some implementations, one or more users may create and/or assign ownership of one or more objectives to themselves and/or another user. In some implementations, a user may be assigned to own an objective and the user may effectuate a reassignment of ownership of the objective from the user or one or more other users.

Progress information for the individual objectives may convey progress toward fulfillment of the individual objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual objectives may be determined independently from incremental completion of the units of work associated with the individual objectives. The completion of the units of work associated with a given objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining one or more record hierarchies of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information. In some implementations, a hierarchical arrangement may dictate access to different records within the hierarchy based on position and/or other information.

By way of non-limiting illustration, a work unit record may be a portfolio record, and a set of subordinate work unit records may include project records and/or other portfolio records. By way of non-limiting illustration, a work unit record may be a portfolio record, and a set of subordinate work unit records may include project records and task records. By way of non-limiting illustration, a work unit record may be a project record, and a set of subordinate work unit records may include task records.

User role information may specify one or more roles of individual users. A role may represent a position of an individual user. A role may represent one or more of how a user works, how a user is expected to work, how a user intends to work, and/or other considerations. The position may be specified based on a description of one or more of a job title, level, and/or other descriptions of position. A role may be specified objectively with respect to a business organization as a whole and/or other specifications. By way of non-limiting illustration, a role may include one or more of the following: chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within work unit records. A role may convey expected contribution and/or extent of user interaction of a user in completing and/or supporting a unit of work. By way of non-limiting illustration, a role within a work unit record may include one or more of owner, manager, creator, reviewer, approver, viewer, final decision maker, assignee, assignor, helper, liaison, and/or other descriptions. The individual roles of individual users within some units of work (e.g., a task) may be specified separately from the individual roles of the individual users within other units of work (e.g., a project associated with the task). The individual roles of individual users within the work unit records may be specified separately from the individual roles of the individual users within a business organization as a whole. For example, a business owner may have an "owner" role with respect to a business organization as a whole, while having a "reviewer" role within a project.

In some implementations, individual roles may dictate the type and/or amount of access the users of the individual roles with individual work unit records and/or within the collaboration environment as a whole. By way of non-limiting illustration, users of an "owner" role of a project record may be able to create subordinate work unit records that support fulfillment of the project record, and/or assign other users as assignees to the subordinate work unit records. A user who is an assignee of a subordinate work unit record may be prevented from creating subordinate work unit records that support fulfillment of the project record, but may be allowed to create sub-subordinate work unit records that support fulfillment of subordinate work unit records they are assigned to. By way of non-limiting illustration, a user of a "viewer" role in a hierarchy of work unit records may only be granted access to view the work unit records in the hierarchy. A user with a "commenter" role within a work unit record may have the ability to add comments to a work unit record, but may not perform other actions such as marking the work unit record as complete, assigning the work unit record to a user, and/or other actions.

In some implementations, environment state information may be continually monitored and/or updated as users interact with the collaboration environment over time. The environment state component 108 may store and/or archive the environment state information continuously, periodically, and/or based on user request to archive. The stored and/or archived environment state information may be referred to as historical environment state information and/or other information.

In some implementations, managing the environment state information by the environment state component 108 may include maintaining queues of work unit records for units of work assigned to the users of a collaboration environment. The queues may be presented to the users in a user interface of the collaboration environment to facilitate access to the work unit records via work unit pages. Individual queues may represent the work unit records assigned to individual users organized in an order based on the individual end dates and/or other dates (e.g., start dates) and/or other ordering. Individual queues may be presented in a user interface based on one or more spatial arrangements. The particular spatial arrangement used by a user may be stored as part of a user record for the user. The spatial arrangements may include one or more of a list view, a calendar view, a board view, and/or other views. The list view may include a vertical arrangement of graphic icons representing work unit records. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.). The board view may include a grid of cells comprising columns and rows, where visual content items (e.g., icons) representing work unit records may be positioned in the cells. Columns may be associated with sections (e.g., different hierarchies, groupings, etc.), and the cells within the column may be populated with visual content items representing work unit records that are associated with the sections.

In some implementations, environment state component 108 may be configured to generate and/or manage page information defining work unit pages (sometimes referred to simply as "pages") corresponding to user records and/or work unit records. Individual work unit pages may provide access to individual records. Managing information may include one or more of determining, obtaining, receiving, requesting, checking, storing, modifying, and/or other operations. Managing information defining individual work unit pages may include providing information to the user interface component 110 to effectuate presentation of the work unit pages, and/or other information. In some implementations, individual work unit pages may include individual sets of interface elements displaying the values of one or more of the work unit parameters of the individual work unit records.

Users may access work unit records via the work unit pages by viewing, adding, changing, deleting, and/or otherwise interacting with values of work unit parameters stored by the work unit records and/or other records. In some implementations, work unit pages providing access to tasks may be referred to as task pages; work unit pages providing access to projects may be referred to as project pages; and work unit pages providing access to objectives may be referred to as objective pages. In some implementations, user pages may include views of the collaboration environment that provide access to user records.

The user interface component 110 may be configured to effectuate communication of interface information to computing platform(s) 104 associated with the users so that the computing platform(s) 104 present instances of a user interface of the collaboration environment. A user interface of the collaboration environment may provide one or more views of the collaboration environment and/or provide other features and/or functionality. The one or more views may include one or more pages of the collaboration environment. The interface information may include page information defining one or more pages of the collaboration environment. In some implementations, a view of the collaboration environment may textually and/or graphically display information (e.g., values of parameters) from one or more of a user record, a task record, a project record, a portfolio record, an objective record, and/or other records. By way of non-limiting illustration, a view may display one or more of a work unit page, a project page, a portfolio page, an objective page, a queue of units of work, and/or other information.

The computing platform(s) 104 may present the work unit pages through which the users access work unit records. Users may provide user input into the work unit pages. The user input may include one or more of selections user interface elements, text additions, drag and drop uploads of digital content items, and/or other user input. Selections may be accomplished through touch-screen input, hovering a cursor and clicking a mouse, entering or typing commands into a command prompt, and/or other types of selections.

The user interface component 110 may be configured to obtain user input information conveying user input into instances of the user interface of the collaboration environment. In some implementations, the user input may include selection of a user interface elements, navigation between pages of a user interface, and/or other input. In some implementations, the type and/or amount of input that is able to be provide into a user interface by a user may be dictated by the access characteristics granted to the user.

The asset group component 112 may be configured to manage asset groups of a computer environment. The individual asset groups may be associated with one or more assets of a computer environment. The individual asset groups may define access characteristics of associated ones of the assets. By way of non-limiting illustration, an asset group may provide a mechanism through which individual users and/or user groups to access one or more assets. That is, an asset group may gate user access to an asset by defining sets of one or more access characteristics to the asset that are able to be realized via the asset group. An asset group may be defined through associations assets, which set out the relationships between the asset groups and the assets. The associations may set out the sets of one or more access characteristics available for an asset through an associated asset group. This may be envisioned as a given asset group comprising a node (e.g., an asset group node), an asset comprising another node (e.g., an asset node), and an edge between the nodes defining a set of one or more access characteristics that are realizable through the asset group (e.g., the asset group-asset relationship). Relationships can define membership for sharing & access control, license assignment from a Billing Account, and more. Asset groups allow the system 100 to represent sets of access characteristics consistently.

By way of non-limiting illustration, the asset groups of a computer environment may include one or more of a first asset group, a second asset group, and/or other asset groups. The first asset group may be associated with a first asset and may define a first set of access characteristics of the first asset of the computer environment. The second asset group may be associated with the first asset and may define a second set of access characteristics of the first asset. By way of non-limiting illustration, in the context of a collaboration environment, the first asset may comprise a first work unit record. The first set of access characteristics may define that "owner," "viewer," "commenter," and "editor" roles are able to be realized for the first work unit record through the first asset group. The second set of access characteristics may define that "manager," "viewer," and "editor" roles are able to be realized for the first asset through the second asset group.

The user group component 114 may be configured to manage user groups. The individual user groups may be associated with one or more asset groups. The individual user groups may define the extent of the access characteristics defined by the individual asset groups that are granted to users through the associated individual user groups. The user groups may provide a mechanism to interpret the set of related users and the extent of the access characteristics that are able to be realized through the asset groups are actually granted to the users of the user groups.

In some implementations, the "extent" of the access characteristics are granted to users may be expressed as a whole (e.g., all of) or a part of (e.g., a subset of) the access characteristics of provided through the asset groups.

By way of non-limiting illustration, the user groups may include one or more of a first user group, a second user group, and/or other user groups. The first user group may be associated with the first asset group and may define a first extent of the first set of access characteristics of the first asset that are granted to the users through the first user group. The second user group may be associated with the first asset group and may define a second extent of the first set of access characteristics of the first asset that are granted to the users through the second user group. By way of non-limiting illustration, the first extent of the first set of access characteristics enabled though the first user group may include a first subset of (e.g., a part of) the first set of access characteristics; while the second extent of the first set of access characteristics enabled though the second user group may include the first set of access characteristics (e.g., the whole of the first set).

Again following the collaboration environment example, the first extent may specify that the "owner," and "editor" roles of the first set of access characteristics are actually granted to the users of the first user group accessing the first asset though the first asset group. The second extent may specify that the "owner," "viewer," "commenter," and "editor" roles of the first set of access characteristics are actually granted to the users of the second user group accessing the first asset though the first asset group. In this example, the second user group grants the users all of the access characteristics of the first set of access characteristics, while the first user group grants a subset of the first set of access characteristics.

The environment state component 108 may be configured to assign the users to the user groups. The assignment to the user groups may cause one or more of the access characteristics of associated ones of the assets to be granted to the users based on the extent of the access characteristics that are actually granted to the users through the user groups. By way of non-limiting illustration, a first user may be assigned to the first user group and/or other user groups; a second user may be assigned to the second user group and/or other groups; and/or one or more other users may be assigned to one or more user groups.

The environment state component 108 may be configured to enable and/or disable individual access characteristics of individual assets for individual users of the user groups. Enabling and/or disabling individual access characteristics may be based on assigned ones of the user groups and extent that the access characteristics defined by the asset groups are actually granted to the users through the user groups.

By way of non-limiting illustration, the first extent of the first set of access characteristics may be enabled for the first user accessing the first asset of the computer environment based on the first user being assigned to the first user group and accessing the first asset via the first asset group. By way of non-limiting illustration, the second extent of the first set of access characteristics may be enabled for the second user accessing the first asset based on the second user being assigned to the second user group and accessing the first asset via the first asset group. Again following the above collaboration environment example, the first user may be able to be assigned an "owner" or an "editor" role within the first work unit record, but specifically not a "commenter" or "viewer" role. The second user may be able to be assigned any of the "owner," "viewer," "commenter," and/or "editor" role within the first work unit record.

The environment state component 108 may be configured to identify asset access conflicts. An asset access conflict may arise as a result of an individual user being granted different access characteristics for a common asset. Various situation may occur where this problem arises.

For example, a first asset access conflict situation may occur where 1) a user group is associated with multiple different asset groups, and 2) each of the asset groups define different access characteristics for a common asset. Further, the user group may define different extents in which the different access characteristics are granted to users through the user group via each of the asset groups. That is, the access characteristics granted through the user group via one asset group and the other asset group may differ, thus posing a conflict.

For example, a second asset access conflict situation may occur where 1) a user is associated with multiple user groups, 2) each of the user groups are associated with different asset groups, and 3) each of the asset groups define different access characteristics for a common asset. Further, each of the user groups may define different extents in which the different access characteristics are granted to the user through the different user group via the different asset groups. That is, the access characteristics to a common asset granted to a user through a first user group/asset group combination may be different from the access characteristics to the common asset granted to the user through a second user group/asset group combination, thus posing a conflict.

For example, a third asset access conflict situation may occur where 1) a user is associated with multiple user groups, 2) each of the user groups are associated with a common asset group, 3) the asset group defines access characteristics for an asset, and 4) each of the user groups define different extents in which access characteristics to the asset are granted to users of the different user groups via the common asset group. That is, the access characteristics to the asset granted to users through a first user group/common asset group combination may be different from the access characteristics to the asset granted to the user through a second user group/common asset group combination, thus posing a conflict.

In one or more asset access conflict situations, a question remains of what access characteristics should be granted to user(s) when it comes to accessing a common asset? As described herein, one or more conflict resolution policies may be implemented to handle such situations, including those more complex than described explicitly herein.

By way of non-limiting illustration, considering the first asset access conflict situation described above, the first user group may also be associated with the second asset group. The first user group may define a third extent of the second set of access characteristics of the first asset that are granted to the users of the first user group via the second asset group. In such a situation, environment state component 108 may be configured to identify a first asset access conflict for the users of the first user group accessing the first asset. That is, the first asset access conflict may arise due to the first extent of the first set of access characteristics to the first asset granted through the first user group via the first asset group differing from the third extent of the second set of access characteristics to the first asset granted through the first user group via the second asset group.

For example, considering the collaboration environment situation, the third extent may specify that the "viewer" and "editor" roles of the second set of access characteristics are actually granted to the users of the first user group accessing the first asset though the second asset group. Again, the first user group accessing the first asset through the first asset group tells us that an "owner" and an "editor" role may be assigned within the first work unit record, but not a "commenter" or "viewer" role. However, the first user group accessing the first asset through the second asset group tells us that only the "viewer" and "editor" roles may be assigned within the first work unit record. One specifically excludes the "viewer" role and designates "owner" as an available role; the other specifically grants the "viewer" role, does not designate an "owner" role altogether. A conflict, therefore, exists.

By way of non-limiting illustration, considering the second asset access conflict situation described above, a given user may be included in the first user group and a third user group. The third user group may be associated with the second asset group and may define an extent of the second set of access characteristics of the first asset that are granted to the users through the third user group. In such a situation, the given user accessing the first asset may have two (conflicting) routes to the first asset, e.g., the first user group via the first asset group, and the third user group via the second asset group. The environment state component 108 may be configured to identify an asset access conflict for the given user given this situation.

By way of non-limiting illustration, considering the third asset access conflict situation described above, a given user may be included in the first user group and the second user group. In such a situation, the given user accessing the first asset may have two (conflicting) routes to the first asset, e.g., the first user group via the first asset group, and the second user group via the first asset group. The environment state component 108 may be configured to identify an asset access conflict for the given user in this situation.

The above descriptions of the first, second, and third asset access conflict situations are provided for illustrative purposes only and are not to be considered limiting as those skilled in the art may appreciate other scenarios where a conflict may arise.

The environment state component 108 may be configured to implement one or more conflict resolution policies to determine which of the access characteristics are to be granted to individual users who are the subject of one or more asset access conflicts. The conflict resolution policies may include rules that allow the conflicts to be resolved. By way of non-limiting illustration, the conflict resolution policies may include one or more of a first conflict resolution policy, a second conflict resolution policy, a third conflict resolution policy, and/or other conflict resolution policies.

In some implementations, the first conflict resolution policy may be associated with giving users of a user group a "maximum" amount of access. Through this policy, a user may be granted more access than would have been granted through any one user/asset group combination. This may include granting all of the access that is being granted through the various asset groups.

In some implementations, the second conflict resolution policy may be associated with giving users of a user group access to the access characteristics that "overlap" between the conflicting groups. Through this policy, a user may be granted access characteristics that are commonly shared between the conflicting groups.

In some implementations, the third conflict resolution policy may be associated with giving users of a user group a "minimum" amount of access. Through this policy, a user may be granted the least amount of access that would have been granted through any of the conflicting groups. This may include granting only the access characteristics of a group that provide the least amount of access.

By way of non-limiting illustration, considering the first asset access conflict situation, the environment state component 108 may be configured to implement the first conflict resolution policy to determine which of the access characteristics are to be granted to the first user. The first conflict resolution policy may result in determining that both the first extent of the first set of access characteristics and the third extent of the second set of access characteristics are granted to the users of the first user group accessing the first asset (e.g., the "maximum"). Continuing with the collaboration environment example, the users of the first user group would be granted the ability to assign the "owner," "editor," and "viewer" roles within the first work unit record.

By way of non-limiting illustration, considering the first asset access conflict situation, the environment state component 108 may be configured to implement the second conflict resolution policy to determine which of the access characteristics are to be granted to the first user. The second conflict resolution policy may result in determining that the access characteristics that are commonly shared between the first extent of the first set of access characteristics and the third extent of the second set of access characteristics are granted to the users of the first user group accessing the first asset (e.g., the "overlap"). Continuing with the collaboration environment example, the users of the first user group would be granted the ability to assign the "editor" role, as it is the only role that is commonly shared.

By way of non-limiting illustration, considering the first asset access conflict situation, the environment state component 108 may be configured to implement the third conflict resolution policy to determine which of the access characteristics are to be granted to the first user. The third conflict resolution policy may result in determining that either the first extent of the first set of access characteristics or the third extent of the second set of access characteristics is granted to the users of the first user group accessing the first asset (e.g., the "minimum"). Continuing with the collaboration environment example, the users of the first user group would be granted the ability to assign either the "owner" and "editor" roles (e.g., first extent of the first set of access characteristics of the first asset group), or the "viewer" and "editor" roles (e.g., third extent of the second set of access characteristics of the second asset group). In this case, if an "owner" role is considered to have relatively more access to assets than a "viewer," achieving the "minimum" amount of access through the third conflict resolution policy would mean the "viewer" and "editor" roles would be roles available to the users of the first user group accessing the first work unit record.

Figure 3:
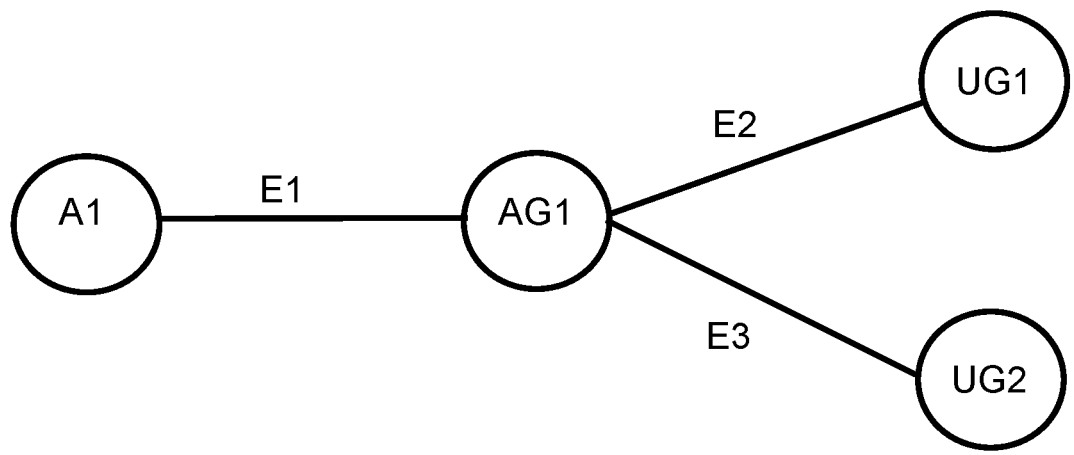
FIG. 3 illustrates relationships between user groups, an asset group, and an asset, in accordance with one or more implementations.

FIG. 3 illustrates relationships between user groups, an asset group, and an asset, in accordance with one or more implementations. The graphic in FIG. 3 is intended to be an illustrative example of how different user groups may be granted different access characteristics even though they are accessing a common asset through a common asset group. For example, a first asset group "AG1" may be connected to a first asset "A1" through a first edge "E1." The first edge E1 may define a relationship between the first asset group AG1 and the first asset A1 in the form of a set of access characteristics of the first asset A1 that are able to be realized through the first asset group AG1. A first user group "UG1" may be connected to the first asset group AG1 through a second edge "E2." The second edge E2 may define a relationship between the first user group UG1 and the first asset group AG1 as it relates to accessing the first asset A1. By way of non-limiting illustration, the second edge E2 may define an extent of the set of access characteristics that are actually granted to the users of the first user group UG1 accessing the first asset A1 through the first asset group AG1. A second user group "UG2" may be connected to the first asset group AG1 through a third edge "E3." The third edge E3 may define a relationship between the second user group UG2 and the first asset group AG1 as it relates to accessing the first asset A1. By way of non-limiting illustration, the third edge E3 may define a different extent of the set of access characteristics that are actually granted to the users of the second user group UG2 accessing the first asset A1 through the first asset group AG1.

In FIG. 3, an asset access conflict may arise for a user that is included in both the first user group UG1 and the second user group UG2 and attempting to access first asset A1. For example, the path from UG1-AG1-A1 may result in the realization of different access characteristics than the path UG2-AG1-A1.

Figure 4:
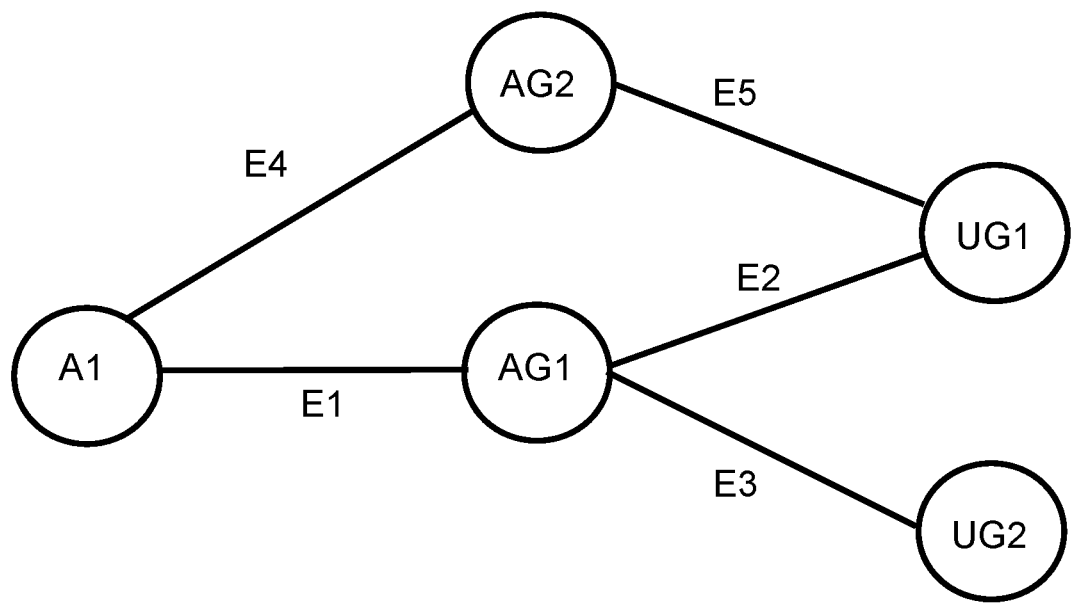
FIG. 4 illustrates relationships between user groups, asset groups, and an asset that may pose a conflict, in accordance with one or more implementations.

FIG. 4 illustrates relationships between user groups, an asset group, and an asset where one or more conflicts may exist, in accordance with one or more implementations. The graphic in FIG. 4 is intended to be an illustrative example of how different user groups may be granted different access characteristics even though they are accessing a common asset through a common asset group. Here, the setup of the first user group UG1, second user group UG2, first asset group AG1, and the first asset A1 may be the same as FIG. 3. However, in FIG. 4, we introduce a second asset group "AG2" connected to the first asset A1 through a fourth edge "E4." The fourth edge E4 may define a relationship between the second asset group AG2 and the first asset A1 in the form of another set of access characteristics of the first asset A1 that are able to be realized through the second asset group AG2. In this situation, the first user group UG1 may also be connected to the second asset group AG2 through a fifth edge "E5." The fifth edge E5 may define a relationship between the first user group UG1 and the second asset group AG2 as it relates to accessing the first asset A1. By way of non-limiting illustration, the fifth edge E5 may define an extent of the other set of access characteristics that are actually granted to the users of the first user group UG1 accessing the first asset A1 through the second asset group AG2. Because the first user group UG1 has two different paths to the first asset A1-a first path being E2-AG1-E1 and a second path being E5-AG2-E4-a conflict as to what access characteristics the users of the first user group AG1 should get arises. As described herein, one or more conflict resolution policies may be implemented to resolve the conflict.

In FIG. 4, another conflict may arise if we consider the relationship E2 is not present (e.g., the first user group UG1 is only associated with the second asset group AG2). By way of non-limiting illustration, a user who is included in both the first user group UG1 and the second user group UG2 and is attempting to access the first asset A1 may pose a conflict. For example, the path from UG1-AG2-A1 may result in the realization of different access characteristics than the path UG2-AG1-A1.

Figure 5:
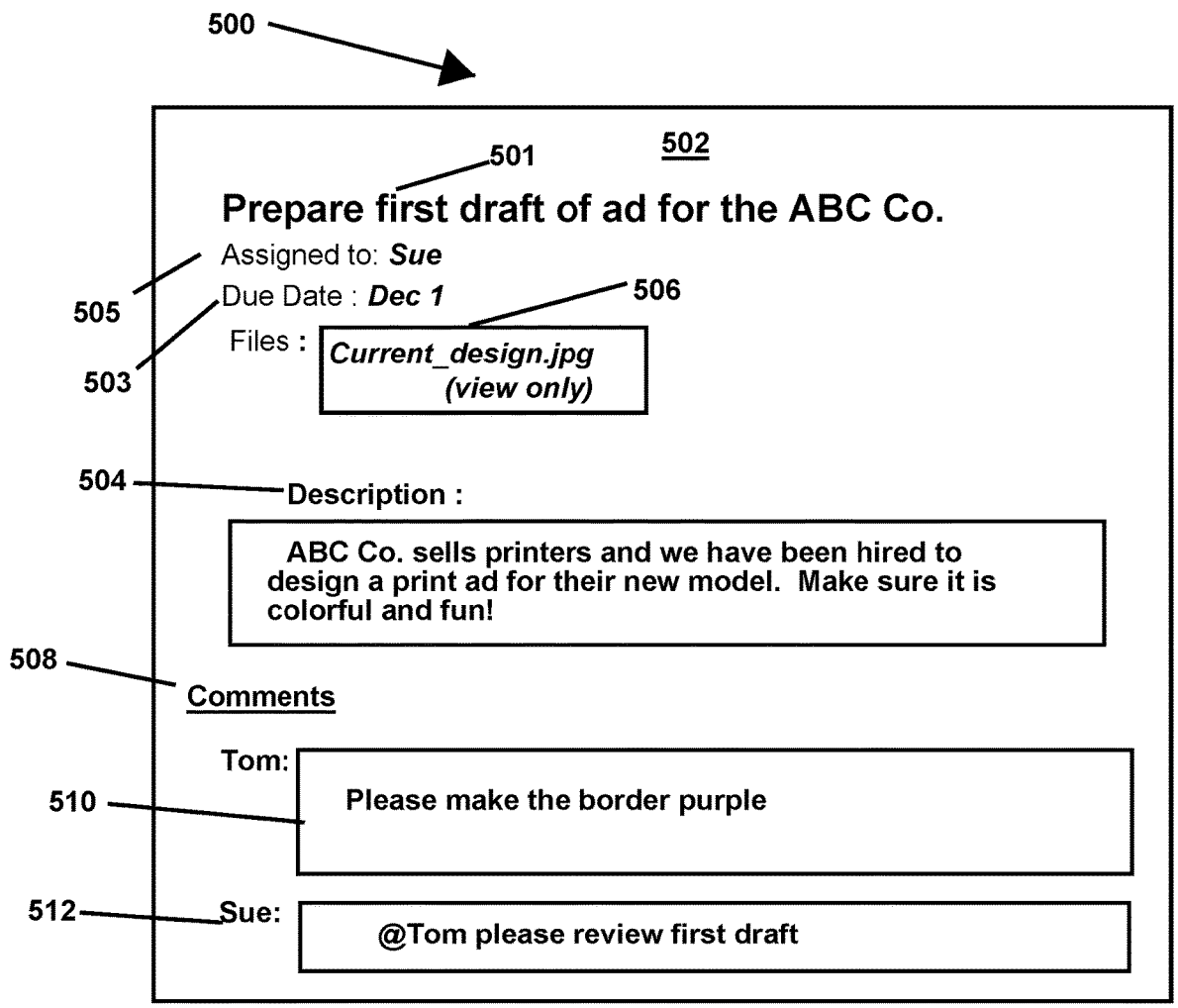
FIG. 5 illustrates a user interface of a collaboration environment, in accordance with one or more implementations.

FIG. 5 illustrates a user interface 500 of a collaboration environment, in accordance with one or more implementations. The user interface 500 may include a view of a collaboration environment. In particular, the user interface 500 may comprise a work unit page 502 for a unit of work through which users access a work unit record for the unit of work. The user interface 500 may display values of one or more work unit parameters and/or other information. By way of non-limiting illustration, a user interface element 501 may display a title of the unit of work. A user interface element 503 may display a due date of unit of work. A user interface element 505 may display an assignee of unit of work. A user interface element or portion 504 may display a description of the unit of work. A user interface element or portion 506 may display a link to a digital content item (e.g., hyperlink to file "Current_design.jpg") and/or other information. A user interface element or portion 508 may display comments added to the work unit page 502. By way of non-limiting illustration, comment 510 may be a comment added by user "Tom"; comment 512 may include a comment added by user "Sue."

The work unit record being accessed through the work unit page 502 may comprise an asset of a collaboration environment. The following are non-limiting examples of the extent of access characteristics that may be granted to the users Tom and Sue, as expressed with respect to interaction with the work unit page 502. Tom may have a first set of access characteristics granted to him for the work unit record that, for example, are an expression of a "commenter" role. Based on this role and associated access characteristics, Tom may be able to view the work unit page 501 and add comments, such as comment 510. However, Tom may be prevented from changing the assignee via element 505, changing the due date via element 503, changing the description via element 504, and/or removing or adding attachments via 506. Sue, on the other hand, may have an "assignee" role, and may be able to view the work unit page 501, add comments such as comment 510, change the due date via element 503, change the description via element 504, and/or remove or add attachments via 506. Sue, however, may be prevented from changing the assignee via element 505.

It is noted that the depiction of a work unit page 501 in FIG. 5 and the descriptions of various access characteristics are for illustrative purpose only and not to be considered limiting. Instead, those skilled in the art may appreciate that a work unit page may be displayed in other ways and access characteristics may be expressed differently than described.

Referring back to FIG. 1, in some implementations, server(s) 102, client computing platform(s) 104, and/or external resource(s) 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126 and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, 114 and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
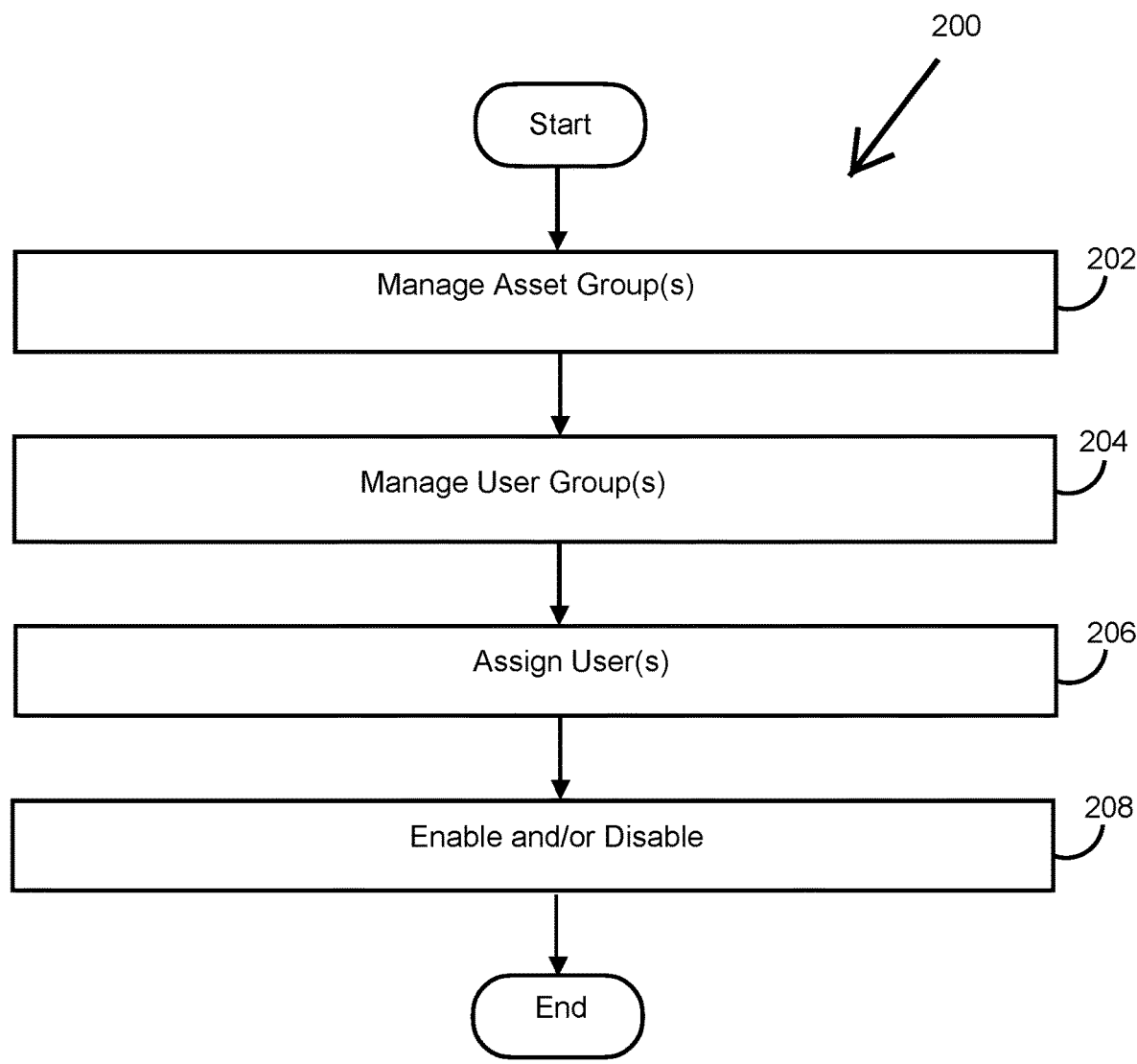
FIG. 2 illustrates a method to manage access to assets of a computer environment based on user and asset grouping, in accordance with one or more implementations.

FIG. 2 illustrates a method 200 to manage access to assets of a computer environment based on user and asset grouping, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage asset groups of a computer environment. The individual asset groups may be associated with one or more assets of a computer environment. The individual asset groups may define access characteristics of associated ones of the assets. By way of non-limiting illustration, the asset groups of a computer environment may include a first asset group and/or other asset groups. The first asset group may be associated with a first asset and may define a first set of access characteristics of the first asset of the computer environment. Operation 202 may be performed by one or more hardware processors configured by machine-readable instructions including a component that is the same as or similar to asset group component 112 (shown in FIG. 1 and described herein), in accordance with one or more implementations.

An operation 204 may manage user groups. The individual user groups may be associated with one or more asset groups. The individual user groups may define the extent of the access characteristics defined by the individual asset groups that are granted to users through the associated individual user groups. By way of non-limiting illustration, the user groups may include one or more of a first user group, a second user group, and/or other user groups. The first user group may be associated with the first asset group and may define a first extent of the first set of access characteristics of the first asset that are granted to the users through the first user group. The second user group may be associated with the first asset group and may define a second extent of the first set of access characteristics of the first asset that are granted to the users through the second user group. Operation 204 may be performed by one or more hardware processors configured by machine-readable instructions including a component that is the same as or similar to user group component 114 (shown in FIG. 1 and described herein), in accordance with one or more implementations.

An operation 206 may assign the users to the user groups. The assignment to the user groups may cause one or more of the access characteristics of associated ones of the assets to be granted to the users based on the extent of the access characteristics that are granted to the users through the user groups. By way of non-limiting illustration, a first user may be assigned to the first user group and/or other user groups; a second user may be assigned to the second user group and/or other groups; and/or one or more other users may be assigned to one or more user groups. Operation 206 may be performed by one or more hardware processors configured by machine-readable instructions including a component that is the same as or similar to environment state component 108 (shown in FIG. 1 and described herein), in accordance with one or more implementations.

An operation 208 may enable and/or disable individual access characteristics of individual assets for individual users of the user groups. Enabling and/or disabling individual access characteristics may be based on assigned ones of the user groups and the extent that the access characteristics defined by the asset groups are granted to the users through the user groups. By way of non-limiting illustration, the first extent of the first set of access characteristics may be enabled for the first user accessing the first asset of the computer environment based on the first user being assigned to the first user group. By way of non-limiting illustration, the second extent of the first set of access characteristics may be enabled for the second user accessing the first asset based on the second user being assigned to the second user group. Operation 208 may be performed by one or more hardware processors configured by machine-readable instructions including a component that is the same as or similar to environment state component 108 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to manage access to assets of a computer environment based on user and asset grouping, the system comprising:

one or more physical processors configured by machine-readable instructions to:

manage asset groups, where individual asset groups are associated with one or more assets of a computer environment and define access characteristics of associated ones of the one or more assets, the asset groups including a first asset group and a second asset group, the first asset group being associated with a first asset and defining a first set of access characteristics of the first asset, the second asset group being associated with the first asset and defining a second set of access characteristics of the first asset;

manage user groups, where individual user groups are associated with the individual asset groups, the individual user groups defining extent of the access characteristics defined by the individual asset groups that are granted to users through the individual user groups, the user groups including a first user group and a second user group, the first user group being associated with the first asset group and defining a first extent of the first set of access characteristics of the first asset that are granted to the users through the first user group, the second user group being associated with the first asset group and defining a second extent of the first set of access characteristics of the first asset that are granted to the users through the second user group, the first user group also being associated with the second asset group and defining a third extent of the second set of access characteristics of the first asset that are granted to the users through the first user group via the second asset group;

assign the users to the user groups to cause one or more of the access characteristics of the associated ones of the one or more assets to be granted to the users based on the extent of the access characteristics that are granted to the users through the user groups, such that a first user is assigned to the first user group and a second user is assigned to the second user group;

enable and/or disable individual access characteristics of individual assets for individual users based on assigned ones of the user groups and the extent that the access characteristics defined by the asset groups are granted to the users through the user groups, such that:

the first extent of the first set of access characteristics is enabled for the first user accessing the first asset based on the first user being assigned to the first user group;

the second extent of the first set of access characteristics is enabled for the second user accessing the first asset based on the second user being assigned to the second user group; and the third extent of the second set of access characteristics is enabled for the first user accessing the first asset based on the first user being assigned to the first user group;

identify asset access conflicts, including identify a first asset access conflict for the first user with respect to accessing the first asset; and implement a conflict resolution policy from a set of available conflict resolution policies to determine which of the access characteristics are to be granted to the first user accessing the first asset, the set of available conflict resolution policies including:

a first conflict resolution policy where both the first extent of the first set of access characteristics and the third extent of the second set of access characteristics are granted to the first user accessing the first asset;

a second conflict resolution policy where the access characteristics that are commonly shared between the first extent of the first set of access characteristics and the third extent of the second set of access characteristics are granted to the first user accessing the first asset; and a third conflict resolution policy where either the first extent of the first set of access characteristics or the third extent of the second set of access characteristics is granted to the first user accessing the first asset.

2. The system of claim 1, wherein the first extent of the first set of access characteristics enabled though the first user group includes a first subset of the first set of access characteristics; and the second extent of the first set of access characteristics enabled though the second user group includes the first set of access characteristics.

3. The system of claim 1, wherein the one or more physical processors are further configured by the machine-readable instructions to:

identify the asset access conflicts as a result of the users of an individual user group being granted different access characteristics for a common asset, such that the first asset access conflict for the users of the first user group is identified by virtue of the first extent of the first set of access characteristics granted through the first user group via the first asset group differing from the third extent of the second set of access characteristics granted through the first user group via the second asset group.

4. The system of claim 1, wherein the access characteristics granted to the users are expressed as one or more of user roles, permissions, license agreements, or control levels.

5. The system of claim 1, wherein the computer environment includes a collaboration environment, and wherein the one or more physical processors are further configured by the machine-readable instructions to:

manage environment state information maintaining the collaboration environment, the collaboration environment being configured to facilitate interaction by users with the collaboration environment, the environment state information including work unit records and user records, the work unit records describing units of work created, managed, and/or assigned within the collaboration environment, the user records describing the users; and wherein an individual asset includes one or more of the work unit records.

6. The system of claim 5, wherein the access characteristics include owner access, editor access, comment access, and view access.

7. The system of claim 5, wherein sets of the work unit records are associated with one or more record hierarchies.

8. A method to manage access to assets of a computer environment based on user and asset grouping, the method comprising:

managing asset groups, where individual asset groups are associated with one or more assets of a computer environment and define access characteristics of associated ones of the one or more assets, the asset groups including a first asset group and a second asset group, the first asset group being associated with a first asset and defining a first set of access characteristics of the first asset, the second asset group being associated with the first asset and defining a second set of access characteristics of the first asset;

managing user groups, where individual user groups are associated with the individual asset groups, the individual user groups defining extent of the access characteristics defined by the individual asset groups that are granted to users through the individual user groups, the user groups including a first user group and a second user group, the first user group being associated with the first asset group and defining a first extent of the first set of access characteristics of the first asset that are granted to the users through the first user group, the second user group being associated with the first asset group and defining a second extent of the first set of access characteristics of the first asset that are granted to the users through the second user group, the first user group also being associated with the second asset group and defining a third extent of the second set of access characteristics of the first asset that are granted to the users through the first user group via the second asset group;

assigning the users to the user groups to cause one or more of the access characteristics of the associated ones of the one or more assets to be granted to the users based on the extent of the access characteristics that are granted to the users through the user groups, including assigning a first user to the first user group and a second user to the second user group; and enabling and/or disabling individual access characteristics of individual assets for individual users based on assigned ones of the user groups and the extent that the access characteristics defined by the asset groups are granted to the users through the user groups, including:

enabling the first extent of the first set of access characteristics for the first user accessing the first asset based on the first user being assigned to the first user group; and enabling the second extent of the first set of access characteristics for the second user accessing the first asset based on the second user being assigned to the second user group; and enabling the third extent of the second set of access characteristics for the first user accessing the first asset based on the first user being assigned to the first user group;

identifying asset access conflicts, including identifying a first asset access conflict for the first user with respect to accessing the first asset; and implementing a conflict resolution policy from a set of available conflict resolution policies to determine which of the access characteristics are to be granted to the first user accessing the first asset, the set of available conflict resolution policies including:

a first conflict resolution policy where both the first extent of the first set of access characteristics and the third extent of the second set of access characteristics are granted to the first user accessing the first asset;

a second conflict resolution policy where the access characteristics that are commonly shared between the first extent of the first set of access characteristics and the third extent of the second set of access characteristics are granted to the first user accessing the first asset; and a third conflict resolution policy where either the first extent of the first set of access characteristics or the third extent of the second set of access characteristics is granted to the first user accessing the first asset.

9. The method of claim 8, wherein the first extent of the first set of access characteristics enabled though the first user group includes a first subset of the first set of access characteristics; and the second extent of the first set of access characteristics enabled though the second user group includes the first set of access characteristics.

10. The method of claim 8, further comprising:

identifying the asset access conflicts as a result of the users of an individual user group being granted different access characteristics for a common asset, including identifying the first asset access conflict for the users of the first user group by virtue of the first extent of the first set of access characteristics granted through the first user group via the first asset group differing from the third extent of the second set of access characteristics granted through the first user group via the second asset group.

11. The method of claim 8, wherein the access characteristics granted to the users are expressed as one or more of user roles, permissions, license agreements, or control levels.

12. The method of claim 8, wherein the computer environment includes a collaboration environment, and wherein the method further comprises:

managing environment state information maintaining the collaboration environment, the collaboration environment being configured to facilitate interaction by users with the collaboration environment, the environment state information including work unit records and user records, the work unit records describing units of work created, managed, and/or assigned within the collaboration environment, the user records describing the users; and wherein an individual asset includes one or more of the work unit records.

13. The method of claim 12, wherein the access characteristics include owner access, editor access, comment-only access, and view-only access.

14. The method of claim 12, wherein sets of the work unit records are associated with one or more record hierarchies.

\* \* \* \* \*